United States Patent Office 3,240,727
Patented Mar. 15, 1966

3,240,727
PROCESS FOR PREPARING CELLULAR BODIES FROM MIXES CONTAINING AMORPHOUS POLYPROPYLENE AND EXPANDED MATERIALS OBTAINED THEREFROM
Francesco Scalari, Ferrara, and Camillo Zanfrognini, Milan, Italy, assignors to Montecatini Società Generale per l'Industria Mineraria e Chimica, Milan, Italy, a corporation of Italy
No Drawing. Filed Dec. 5, 1961, Ser. No. 188,913
Claims priority, application Italy, Dec. 9, 1960, 21,215/60
(Filed under Rule 47(a) and 35 U.S.C. 116)
18 Claims. (Cl. 260—2.5)

The present invention relates to a process for preparing cellular bodies provided with very small, uniform non-intercommunicating cells from mixes of amorphous polypropylene with rubbers or vulcanizable polymers or copolymers of alpha-olefins or conjugated diolefins. It is known that polypropylene prepared with stereospecific catalysts consists of a crystalline, a stereoblock and an amorphous fraction; the crystalline fraction shows high thermal and mechanical characteristics and is used in many fields, particularly in the plastic field.

However, the completely or substantially amorphous or stereoblock fraction of such polymers heretofore have not found any application in the field of expanded plastics.

An object of the resent invention is to provide a process for obtaining good expanded bodies from amorphous polypropylene, which polypropylene may either be produced directly with the aid of suitable metal-organic catalysts or may be obtained by extraction, with hot or cold heptane, of polypropylene containing isotactic fractions.

According to one aspect of the invention the expanded material is obtained by preparing a mix consisting of amorphous polypropylene and at least one blowing agent, heating this mix under pressure, and then expanding it.

According to another aspect of the invention, an amorphous polypropylene is mixed with rubbers or with vulcanizable alpha-olefin or diolefin polymers or copolymers, vulcanization agents or accelerators, and stabilizers, and the mix is heated in the presence of a gas or a swelling agent and then vulcanized to obtain cellular products or expanded materials having numerous applications, e.g., as electrical insulating materials, as liners or paddings, cushions, etc. The amorphous polypropylene used in our process can be prepared directly with the aid of Natta metal-organic catalysts or can be obtained by heptane extraction of polypropylene containing isotactic or stereoblock fractions. Such amorphous polypropylene has an intrinsic viscosity, as determined in tetrahydronaphthalene at 135° C., of less than 1, and preferably less than 0.9 and higher than 0.4.

The vulcanizable polymer or copolymer which may be added to the amorphous polypropylene is preferably selected from the group consisting of butadiene polymers, more particularly, polybutadiene produced with sodium catalysts ("Buna 32"), polyisoprene, polyisobutylene, butadiene-styrene copolymers, e.g., SBR rubber, and ethylene-propylene and ethylene-butene copolymers.

The process of our invention has given surprising results since it permits the use of amorphous polypropylene in the preparation of expanded materials. Of even greater significance, because of the high compatibility of rubbers with amorphous polypropylene (i.e., up to about 20% of the polypropylene), it is possible to further improve the properties of the expanded bodies by vulcanization. As will be noted from Table I (in which is set forth the percentage of residual deformation recovered from a hysteresis cycle with a 1 minute relaxation time, carried out at 23° C.), expanded products obtained from mixtures of amorphous polypropylene with vulcanizable products are considerably modified and improved as compared to an expanded body made solely of amorphous polypropylene.

TABLE I

| Compound | Percent residual deformation (from a hysteresis cycle at 230° C., one minute relaxation time) |
|---|---|
| Expanded body from amorphous polypropylene alone | 40 |
| Expanded body from a mixture of amorphous polypropylene with 10% (based on the polypropylene) of an ethylene-propylene copolymer | 9 |
| Expanded body from a mixture of amorphous polypropylene with 20% of an ethylene-propylene copolymer | 3 |
| Expanded body from a mixture of amorphous polypropylene with 10% of polybutadiene | 6 |
| Expanded body from a mixture of amorphous polypropylene with 40% of ethylene-propylene copolymer | 14 |
| Expanded body from a mixture of amorphous polypropylene with 80% of ethylene-propylene copolymer | 23 |

The hysteresis tests were carried out on an Instron dynamometer by compressing the material to 50% and holding it at such compression for 1 minute, then permitting the material to relax for 1 minute, and measuring.

The values in the table indicate that addition of a vulcanizable polymer or copolymer to amorphous polypropylene is particularly advantageous where the amount of such addition does not exceed about 20% per 100 parts of amorphous polypropylene.

In addition to the remarkable improvements in elasticity and shape retention capacity (form stability) of the expanded products obtained by the process of our invention, we have also found that the addition of vulcanizable rubbers or polymers or copolymers of alpha-olefins or diolefins followed by expansion and vulcanization result in an expanded product having a high dimensional stability at high temperatures. Further, there results a remarkable decrease in the percentage of ethanol which can be absorbed by contact with our expanded products.

A sample consisting solely of expanded amorphous polypropylene, when immersed in ethanol, absorbs 50% thereof within 20 minutes and 75% within one hour. In contrast, various samples produced from mixtures of amorphous polypropylene with vulcanizable rubbers or alpha-olefin polymers, diolefin polymers, etc., absorb only 5% after contact for 1 hour. This demonstrates that the cells are not intercommunicating. Therefore, the insulating power of such materials is quite high.

The cellular materials of our invention are therefore suitable for various applications, particularly in the electrical field due to their good resistance to cracking.

As regards dimensional stability at high temperatures, an expanded product according to our invention remains unaltered in its form after 2 hours at 160° C., whereas a sample of amorphous polypropylene alone was completely molten after 10 minutes at 130° C.

In order to produce the cellular bodies of our invention one can incorporate an amount not higher than about 15% of a normally solid blowing agent which decomposes with evolution of gas at a temperature at which the polymeric compound has a certain degree of plasticity. Alternatively, a gas such as nitrogen, $CO_2$, air, etc. may be introduced into the mass to be expanded, at a temperature wherein such mass has been rendered plastic. The heating to expand the mass is generally carried out at a temperature from about 100° to 200° C. After expansion, the mass is generally vulcanized at a higher temperature, generally from about 110° to 230° C.

For the homogenization of the compounds to form a mix, a roll mixer, Banbury, extruder, or other device may be used. In addition to the solid blowing agent, preferably p,p'-oxy-bis(benzenesulfonyl-hydrazide), and the vulcanizing agents (e.g., sulfur, peroxides, hydroperoxides and/or dimaleimide), other substances such as $SiO_2$, $CaCO_3$, calcium silicate, kaolin, carbon black can be profitably incorporated in the compound in proportions of 0.5 to 5% of the overall composition, thus contributing to the control of the cell size.

The following examples illustrate our invention without limiting its scope.

Example 1

A mix having the following composition is homogenized in a roll mixer:

| | Parts |
|---|---|
| Amorphous polypropylene (having an intrinsic viscosity $\eta$ measured in tetrahydronaphthalene at 135° C. of 0.6) | 90 |
| Polybutadiene (molecular weight as measured in toluene at 30° C., between 10,000 and 80,000) | 10 |
| $SiO_2$ | 1.5 |
| p,p'-Oxy-bis(benzenesulfonyl-hydrazide) | 7 |
| Sulfur | 0.2 |
| ZnO | 0.5 |

80 g. of the mix are placed in a 250 cc. mold which is tightly sealed and then heated in a press at 135° C. for 15 minutes and then at 160° C. for 30 minutes. After cooling under pressure and then degassing, a product having an apparent density of 0.25 g./cm.³ is obtained.

Example 2

25 g. of a mix having the following composition:

| | Parts |
|---|---|
| Amorphous polypropylene ($\eta$=0.80) | 85 |
| Ethylene-propylene copolymer (molecular weight between 80,000–100,000) | 15 |
| $SiO_2$ | 0.5 |
| p,p'-Oxy-bis(benzenesulfonyl-hydrazide) | 7 |
| Sulfur | 0.2 |
| Dicumyl peroxide | 2 | are placed in a 100 cc. mold. By operating as described in Example 1 an expanded product having an apparent density of 0.25 g./cm.² is obtained.

Example 3

80 g. of a mix having the following composition:

| | Parts |
|---|---|
| Amorphous polypropylene ($\eta$=0.62) | 80 |
| SBR rubber | 20 |
| $SiO_2$ | 3 |
| Sulfur | 0.4 |
| ZnO | 1 |
| Zinc dimethyl dithiocarbamate | 0.06 | are placed in a mold in which nitrogen is introduced under a pressure of 20 atm. This mold is heated under pressure at 135° C. for 15 minutes and then 160° C. for 30 minutes, thereby obtaining an expanded product having an apparent density of 0.30 g./cm.³.

Example 4

A mix having the following composition is homogenized in a Banbury mixer:

| | Parts |
|---|---|
| Amorphous polypropylene ($\eta$=0.7) | 90 |
| Polyisobutylene: (molecular weight=70,000) | 10 |
| p,p'-Oxy-bis(benzenesulfonyl-hydrazide) | 7 |
| Zinc dimethyldithiocarbamate | 0.2 |
| ZnO | 0.5 |
| Sulfur | 0.2 |

The mix is placed in a closed mold and heated in a press at 135° C. for 15 minutes for expansion and then is heated at 165° C. for 30 minutes for vulcanization. After cooling, a product having an apparent density of 0.20 g./cm.³ is obtained.

Example 5

A mix having the following composition:

| | Parts |
|---|---|
| Amorphous polypropylene ($\eta$=0.45) | 100 |
| Antioxidant (2,6-ditert-butylphenol) | 0.5 |
| Blowing agent: azodicarbamide (Genitron AC of Bayer) | 5 | is prepared in a cold roll mixer.

The mix is then placed in a mold and heated under pressure at 150° C. for 30 minutes. After this heating the mix is cooled to 90–100° C. under pressure and at this temperature the material is permitted to expand. The material thus obtained had a good expansion with the formation of regular, uniform cells. The density varied from 0.2 and 0.5.

Variations can, of course, be made without departing from the spirit of our invention.

We claim:

1. A method of preparing a vulcanized expanded material containing very small uniform discrete non-communicating cells, this method comprising homogeneously mixing amorphous polypropylene, said polypropylene having an intrinsic viscosity, as determined in tetrahydronaphthalene at 135° C., of less than 1, with an elastomeric vulcanizable copolymer of ethylene with an alpha-olefin, along with a vulcanizing agent selected from the group consisting of organic peroxides, organic hydroperoxides and dimaleimide, and a blowing agent, the amount of said copolymer in said mixture being from about 10 to 80 parts by weight per 100 parts of said polypropylene, heating said mixture under pressure at a temperature of from about 100 to 200° C. to expand said mixture, and thereafter heating said expanded mixture at a temperature higher than said expanding temperature to thereby vulcanize said expanded mixture.

2. The process of claim 1, wherein said vulcanizable copolymer is an ethylene-butene copolymer.

3. The method of claim 1 wherein said vulcanizable copolymer is an ethylene-propylene copolymer.

4. The method of claim 1 wherein said blowing agent is azodicarbamide.

5. The method of claim 1 wherein said blowing agent is a gas selected from the group consisting of nitrogen, carbon dioxide, and air.

6. The process of claim 1, wherein said amorphous polypropylene has an intrinsic viscosity, as determined in tetrahydronaphthalene at 135° C., from about 0.4 to 0.9.

7. The process of claim 1, wherein said vulcanizable copolymer is added in an amount up to about 20 parts by weight per 100 parts of amorphous polypropylene.

8. The process of claim 1, wherein the heating is carried out in the presence of an azoic blowing agent.

9. The process of claim 1, wherein said pressure is from 5 to 150 atmospheres.

10. The process of claim 1, wherein said blowing agent is a solid material and is present in an amount not exceeding 15% by weight of the mixture.

11. The process of claim 1, wherein said blowing agent is p,p'-oxy-bis(benzenesulfonyl-hydrazide).

12. The process of claim 1, wherein the vulcanization is carried out between 120° and 230° C.

13. The process of claim 1, wherein said vulcanization agent includes sulfur.

14. The process of claim 13, wherein said vulcanization agent includes an accelerator and a stabilizer.

15. The process of claim 1, wherein a substance selected from the group consisting of silica, calcium carbonate, kaolin and carbon black is added to the mixture in a proportion of from 0.5 to 5% by weight of the mixture, to thereby control the cell size.

16. A vulcanized expanded material having very small, uniform, discrete, non-intercommunicating cells and low density, said material comprising a mixture of amorphous polypropylene having an intrinsic viscosity, as determined in tetrahydronaphthalene at 135° C., of less than 1, and an elastomeric copolymer of ethylene and an alpha-olefin, the amount of said copolymer in said mixture being from about 10 to 80 parts by weight per 100 parts of said polypropylene.

17. The product of claim 16 wherein said alpha-olefin is propylene.

18. The product of claim 16 wherein said alpha-olefin is butene.

References Cited by the Examiner

UNITED STATES PATENTS

| 2,849,028 | 8/1958 | Clark et al. | 260—2.5 |
| 2,874,153 | 2/1959 | Bowman et al. | 260—93.7 |
| 2,927,904 | 3/1960 | Cooper | 260—2.5 |
| 3,017,371 | 1/1962 | Hohenberg et al. | 260—2.5 |
| 3,072,972 | 1/1963 | Yokese et al. | 260—2.5 |

FOREIGN PATENTS

| 1,184,734 | 2/1959 | France. |
| 856,735 | 12/1960 | Great Britain. |

MURRAY TILLMAN, *Primary Examiner.*

LEON BERCOVITZ, *Examiner.*